(12) United States Patent
Luo et al.

(10) Patent No.: US 7,545,259 B2
(45) Date of Patent: Jun. 9, 2009

(54) VEHICLE LOCATING USING GPS

(75) Inventors: Yi Luo, Superior Township, MI (US); John S. Nantz, Brighton, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 296 days.

(21) Appl. No.: 11/511,189

(22) Filed: Aug. 28, 2006

(65) Prior Publication Data

US 2008/0055116 A1    Mar. 6, 2008

(51) Int. Cl.
*B60R 25/10* (2006.01)
(52) U.S. Cl. .......................... 340/426.13; 340/426.17; 340/426.19; 340/539.13; 340/825.49; 340/988; 340/989; 342/357.01; 342/357.08; 701/36; 701/213
(58) Field of Classification Search ............ 340/426.13, 340/426.16, 426.19, 539.13, 539.32, 425.5, 340/825.36, 825.49, 988, 426.17, 989; 342/350, 342/352, 357.01, 357.08; 701/36, 200, 213
See application file for complete search history.

(56) References Cited

U.S. PATENT DOCUMENTS

| | | | |
|---|---|---|---|
| 5,682,133 A * | 10/1997 | Johnson et al. | ........ 340/426.19 |
| 6,363,324 B1 | 3/2002 | Hildebrant | |
| 6,392,592 B1 | 5/2002 | Johnson et al. | |
| 6,489,921 B1 | 12/2002 | Wilkinson | |
| 6,529,142 B2 * | 3/2003 | Yeh et al. | .................... 340/988 |
| 6,694,258 B2 | 2/2004 | Johnson et al. | |
| 6,738,712 B1 | 5/2004 | Hildebrant | |
| 6,791,477 B2 * | 9/2004 | Sari et al. | .............. 340/995.19 |
| 6,909,964 B2 | 6/2005 | Armstrong et al. | |
| 7,148,802 B2 * | 12/2006 | Abbruscato | ............ 340/539.13 |
| 7,272,494 B2 * | 9/2007 | Murray et al. | .............. 701/207 |
| 7,295,920 B2 * | 11/2007 | Finkelstein | ................. 701/207 |
| 2002/0008660 A1 | 1/2002 | Johnson et al. | |
| 2003/0132878 A1 | 7/2003 | Devereux et al. | |
| 2003/0139878 A1 | 7/2003 | DeLuca et al. | |
| 2003/0197640 A9 | 10/2003 | Johnson et al. | |
| 2004/0006426 A1 | 1/2004 | Armstrong et al. | |
| 2005/0128140 A1 | 6/2005 | Luo et al. | |
| 2005/0195106 A1 | 9/2005 | Davis et al. | |

FOREIGN PATENT DOCUMENTS

| | | |
|---|---|---|
| DE | 19938951 A1 | 3/2001 |
| EP | 1378878 A1 | 1/2004 |
| EP | 1571598 A1 | 9/2005 |
| FR | 2881838 A1 | 8/2006 |

OTHER PUBLICATIONS

Great Britain Search and Examination Report for corresponding Application No. GB0715841.3, mailed Nov. 26, 2007, 7 pages.
German Office Action for corresponding German Application No. 10 2007 031 266.2, mailed Jan. 23, 2009, 5 pages.

* cited by examiner

*Primary Examiner*—Hung T. Nguyen
(74) *Attorney, Agent, or Firm*—Brooks Kushman P.C.

(57) ABSTRACT

Method, fob, and system suitable for use in directing a user to the vehicle. The direction being determined as a function of GPS coordinates determined with GPS units on a fob and vehicle. The GPS unit being activated in coordination with each other such that the GPS coordinates associated with the same are commonly inaccurate.

19 Claims, 2 Drawing Sheets

VEHICLE LOCATING USING GPS

BACKGROUND OF THE INVENTION

1. Field of the Invention

The present invention relates to utilizing a fob to direct a user to a vehicle using GPS coordinates.

2. Background Art

Car locating systems having a portable GPS receiver carried by the vehicle user and a car-mounted GPS receiver have been proposed. Typically, a GPS-derived location of the car when it is parked is downloaded to the portable receiver as a waypoint. Later, when the user wants to return to the vehicle, the portable receiver is actuated to determine its current location and to then provide a direction and distance to the vehicle waypoint.

Atmospheric, noise, timing, and any number of other conditions, as one having ordinary skill in the art will appreciate, can influence the ability of the fob to direct the user to the previously stored waypoint. The follow list provides a range of distance variations that may be introduced to GPS signals: ionosphere 0-30 meters; troposphere 0-30 meters; measurement noise 0-10 meters; ephemeris data 1-5 meters; clock drift 0-1.5 meters; and multipath 0-1 meters.

These variables, without correction, cause the fob to provide inaccurate directionality information with respect to the stored waypoint. If the fob is deactivated or otherwise prevented from monitoring/receiving GPS coordinates, the fob loses its ability to correct itself relative to the previously stored waypoint. Thereafter, the fob is unable to accurately locate the waypoint such that subsequently GPS calculations based on the previously stored coordinates tend to be relatively inaccurate.

These inaccuracies may be further exacerbated as a function of distance to the vehicle. If the user is relatively close to the vehicle and the fob determines an inaccurate direction to the vehicle due to the varying GPS coordinates, the user can be directed away from the vehicle or in a direction that is unlikely to result in the user locating the vehicle. If the user is relatively far from the vehicle, the errors are less important due to the distance that must be traveled to reach the vehicle.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
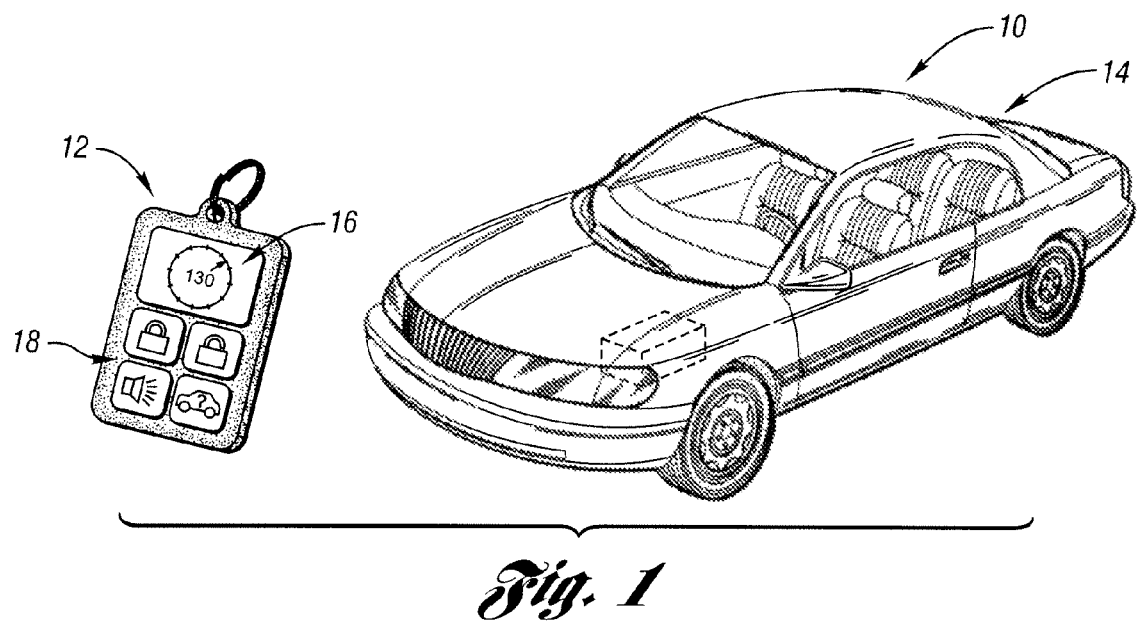
FIG. 1 illustrates a vehicle locating system in accordance with one non-limiting aspect of the present invention.

FIG. 1 illustrates a vehicle locating system 10 in accordance with one non-limiting aspect of the present invention. The system includes a fob 12 to facilitate directing a user to a vehicle 14. The fob 12 may include a display 16 or other feature suitable for displaying information associated with directing the user to the vehicle 14, such as but not limit to a compass and distance bearing to the vehicle 14. In this manner, the fob 12 may display a direction for use in directing the user to the vehicle 14.

The fob 12 may include other features, such as but not limited to remote keyless entry (RKE) features 18, to facilitate other operations commonly associated with key fobs. This allows the fob 12 to interact with any number of vehicle operating systems while also providing directionality capabilities. The fob 12 is described for use directing the user to the vehicle without intending to limit the scope and contemplation of the present invention. The present invention fully contemplates using the fob to direct the user to any number of elements having features suitable for operation with the fob as required by the present invention, and not just vehicles.

Figure 2:
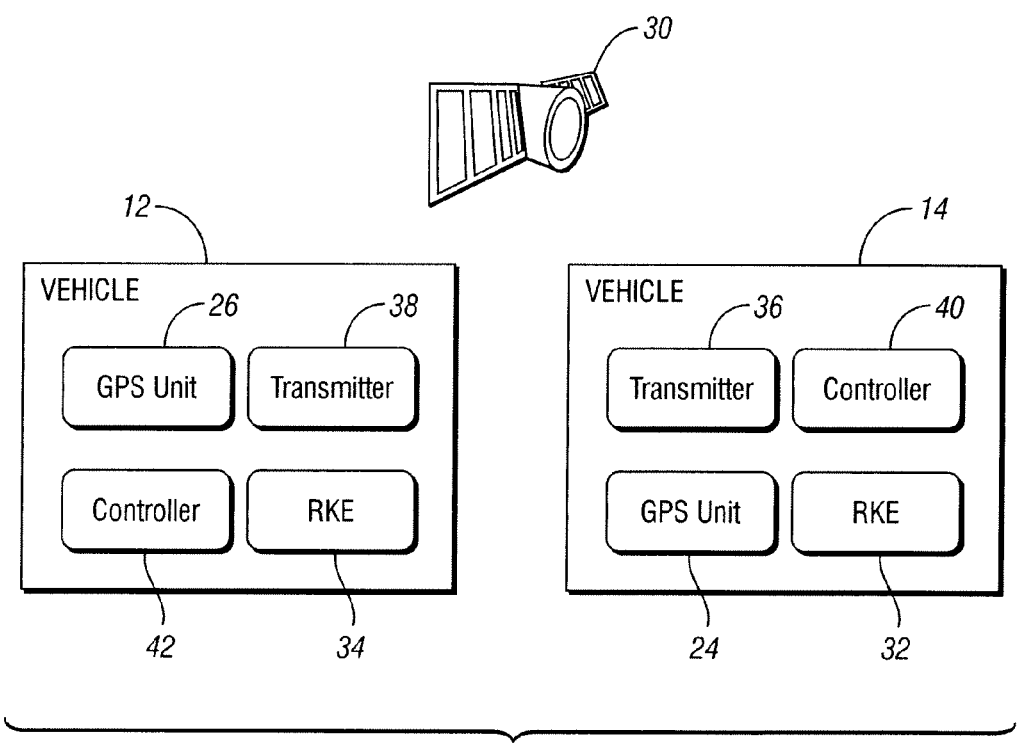
FIG. 2 schematically illustrates additional features of the system in accordance with one non-limiting aspect of the present invention.

FIG. 2 schematically illustrates additional features of the vehicle 14 and fob 12 in accordance with one non-limiting aspect of the present invention. The vehicle 14 and fob 12 may include global positioning (GPS) units 24-26 configured to facilitate determining GPS coordinates as a function of signals received from a GPS satellite 30. The GPS units may determine directionality, bearing, heading, and other types of information associated with assessing positioning of the vehicle and fob.

The vehicle 14 and fob 12 may include RKE units 32-34 to facilitate RKE operations between the vehicle 14 and fob 12. The RKE options may include any number of capabilities commonly associated with RKE operations, such as but not limited to panic alarms, door locking, trunk opening, etc.

The vehicle 14 and fob 12 may include transmitter 36-38 to facilitate communications between the fob 12 and vehicle 14. The transmitters 36-38 may be standalone transmitters and/or transmitters integrated with one or more elements of the vehicle 14 and fob 12. The transmitters 36-38 may be suitable for communicating signals between the GPS units 24-26 and RKE units 32-34 so as to facilitate executing the operations associated therewith.

The vehicle 14 and fob 12 may include controllers 40-42 to facilitate coordinating operations of the various elements included therewith. The controllers 40-42 may include memories, processors, and other features associated with executing any number of operations suitable for controlling and/or directing operations of the fob 12 and vehicle 14. Optionally, the operations and features associated with the RKE and GPS units may be integrated into logic or other executing features of the controller such that the controllers are responsible for coordinating the operations associated therewith.

Figure 3:
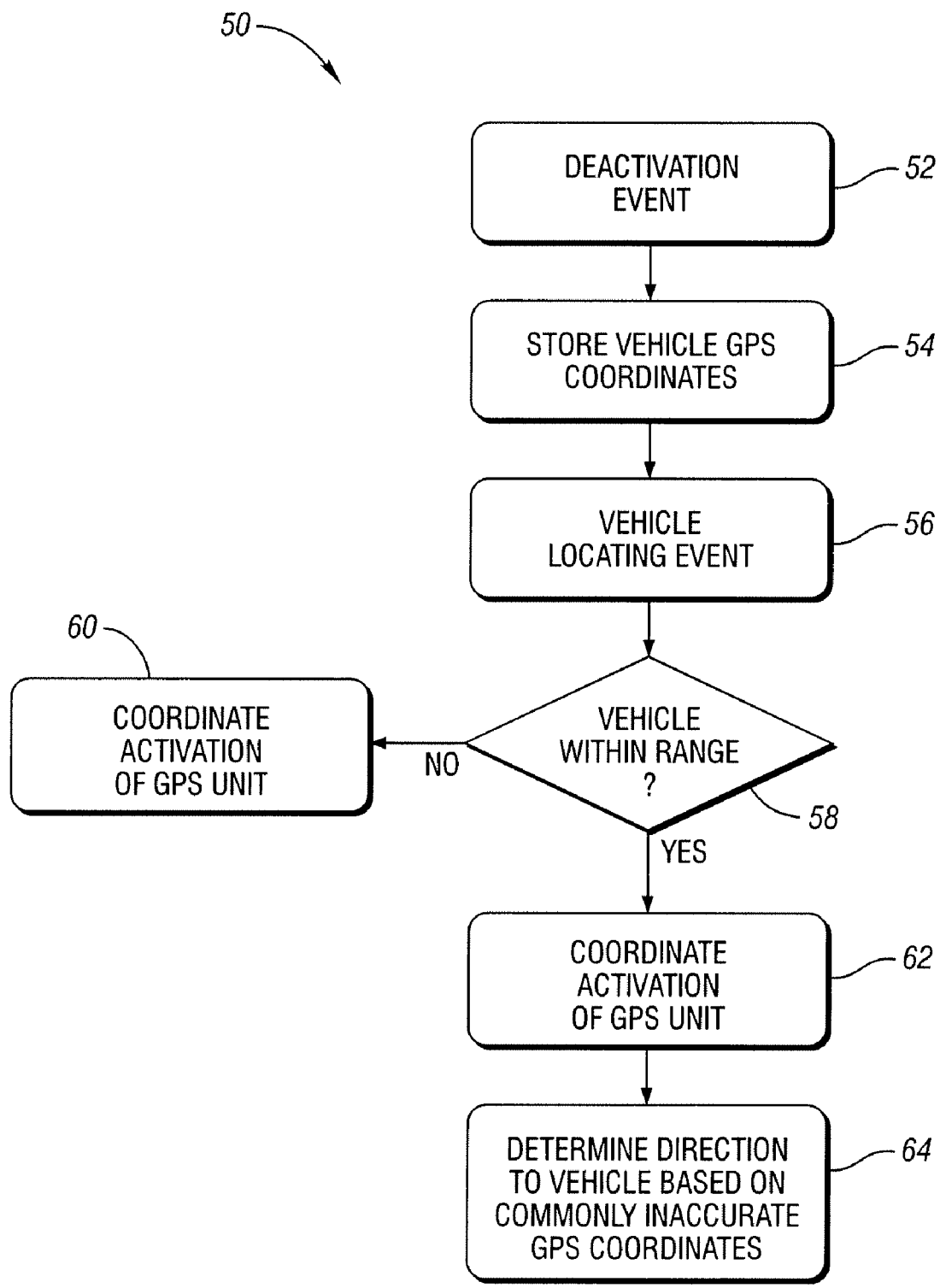
FIG. 3 illustrates a flowchart of a method of locating a vehicle in accordance with one non-limiting aspect of the present invention.

FIG. 3 illustrates a flowchart 50 of a method of locating a vehicle in accordance with one non-limiting aspect of the present invention. The method relates to the fob determining directionality information sufficient for directing a user to the vehicle. As noted above, the method is described with respect to locating a vehicle without intending to limit the scope and contemplation of the present invention. The method of the present invention is suitable for use in locating other items, and not just vehicles.

Block 52 relates to determining a GPS deactivation event. The deactivation event may be associated with any number of events associated with deactivating the GPS units on each of the fob and vehicle. The deactivation may correspond with shutdown or other inactivity of the GPS units such that the GPS units are no longer updating GPS position and/or receiving GPS coordinates from the satellite. This can present a problem with activating the GPS units as the coordinates initially determined after activation are some what inaccurate and inconsistent with previous GPS coordinates.

The GPS deactivation event may correspond with any number of operating parameters and events, such as but not limited to vehicle shutdown, exiting the vehicle with the fob, and any number of other events after which it may be desirable to deactivate the GPS units. It may be desirable to deactivate the GPS units for any number of reasons, such as but not limited to conserving battery power of batteries used to power the GPS units.

Block 54 relates to the fob storing the vehicle GPS coordinates upon occurrence of the deactivation event. The fob maybe configured to automatically store the coordinates upon occurrence of the deactivation event. This may include the vehicle GPS unit transmitting the vehicle GPS coordinates to the fob and/or the fob GPS unit storing the current fob GPS coordinates as the vehicle GPS coordinates. The storage of the vehicle GPS coordinates in this manner allows the fob to set a waypoint for subsequently locating the vehicle.

Block 56 relates to determining a vehicle locating event. The vehicle locating event may correspond with any event associated with the user desiring to locate the vehicle. Optionally, the fob may include a locating button that user may actuate to trigger the vehicle locating event. As described below in more detail, the locating event instigates the fob to display a direction to the vehicle that the user may follow to facilitate locating the vehicle from a remote location.

Block 58 relates to determining whether the fob is within a predefined range relative to the vehicle. The range may correspond with a distance suitable for communications between the fob and vehicle, such as but not limited a RKE range associated with supporting RKE functionality, commonly 200 meters. The range determination may be made based on RKE information received by the fob from the vehicle and/or based on a response or lack of response from the vehicle to a test signal sent from the fob to the vehicle upon actuation of the locating button.

Block 60 relates to the fob being out of range and determining a direction to the vehicle based on the previously stored vehicle GPS coordinates. This may include activating the fob GPS unit to determine the current fob GPS coordinates and comparing the fob GPS coordinates with the previously stored vehicle GPS coordinates. This information may then be used in determining the directionality associated with locating the vehicle.

Advantageously, the distance of the fob relative to the vehicle, i.e. the range of the fob, is preferably sufficiently great to render insignificant the inherent inaccuracies in ability of the fob GPS unit to wake up and determine the current fob GPS coordinates. In this manner, the fob GPS unit may be activated and immediately used to provide the user with an initial direction to the vehicle. Thereafter, the fob GPS unit may instigate commonly used correction methodologies to increase is precision relative to the stored vehicle coordinates.

Block 62 relate to the fob being in range and coordinating activation of the fob and vehicle GPS units. This coordination generally corresponds with simultaneously or otherwise activating the GPS units such that each unit becomes activated at substantially the same time. The period of time associated with the simultaneous activation corresponds with the amount of error in the GPS signals. With current technology, the GPS units may have sufficiently related GPS signaling if they are activated within 10 seconds of each other.

The correspondence in activation is advantageous in that the GPS coordinates determined by the respective units will include relatively the same level of inaccuracies such that the GPS coordinates are commonly inaccurate. In effect, the commonly inaccurate GPS coordinates can be used as benchmark or zeroing out of the respective GPS coordinates. This allows the present invention to accurately determine the relative position of the vehicle to the fob after a start. The activation of the units in this manner may take any number forms.

One activation procedure may correspond with the fob transmitting an activation signal, which may be included in the range signal used in Block 58, to the vehicle GPS unit that causes the vehicle GPS unit to instantaneously become active. The fob GPS unit may then coordinate its activation with the expected activation of the vehicle GPS unit such that both units become activate at approximately the same time. Optionally, the fob may include a timing element to facilitate this coordination.

The timing element may be used to delay activation of the fob GPS unit according to a period of time associated with transmitting the activation signal to the vehicle GPS unit and time associated with the vehicle GPS unit receiving the signal and activating itself. The respective controllers may be suitable to control and/or direct activation of the respective GPS units.

Block 64 relates to determining a direction to the vehicle based on the commonly inaccurate GPS coordinates determined by the vehicle and fob GPS units. This may include the vehicle GPS unit determining the vehicle GPS coordinates and transmitting them to the fob GPS unit for processing with fob GPS coordinates determined at approximately the same time by the fob GPS unit. The fob GPS unit may compare the GPS coordinates to determine an accurate direction to the vehicle.

Alternatively, the fob GPS unit may transmit the fob GPS coordinates to the vehicle GPS unit for processing with vehicle GPS coordinates determined at approximately the same time by the vehicle GPS unit. The vehicle GPS unit may compare the GPS coordinates to determine an accurate direction to the vehicle. This directionality information may then be transmitted back to the fob for use in directing the user to the vehicle.

As described above, the present invention provides a system and method for directing a user to a vehicle. The directionality information associated with directing the user to the vehicle may be based on commonly inaccurate GPS coordinates determined during start of GPS units such that the commonly inaccurate GPS coordinates provide accuracy in directing the user to the vehicle. For distances beyond the communication range of the fob, the fob may rely on the inaccurate GPS coordinates as the errors associated therewith are acceptable relative to the distance form the vehicle, whereby the inaccuracies can thereafter be correct with commonly used correction techniques.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle locating system for utilizing a fob to direct a user to a vehicle, the system comprising: GPS units included on the vehicle and the fob that are respectively configured to determine GPS coordinates for the vehicle and fob, the GPS units being configured to activate at approximately the same time so as to facilitate determining a direction to the vehicle as a function of commonly inaccurate GPS coordinates: and transmitting a wake up signal to the vehicle GPS unit in response to actuation of a locating button on the fob, the wake up signal used to facilitate activating the vehicle GPS unit, wherein the activating of the vehicle GPS unit and the fob GPS is defined to be at approximately the same time if both of the vehicle and fob GPS transmit requests for GPS coordinates to a GPS satellite at approximately the same time.

2. The system of claim 1 wherein the fob determines the direction to the vehicle upon transmission of the vehicle GPS coordinates to the fob if the fob is within a predefined range relative to the vehicle.

3. The system of claim 2 wherein the fob GPS unit determines the direction to the vehicle as a function of GPS coordinates previously stored for the vehicle if the fob is beyond the predefined range to the vehicle.

4. The system of claim 3 wherein the fob automatically stores the GPS coordinates upon exiting the vehicle.

5. The system of claim 2 wherein the vehicle includes a remote keyless entry (RKE) unit configured to operate with a fob RKE unit, and wherein the vehicle RKE unit is configured to determine if the fob is within the predefined range as a function of RKE signals associated with the fob.

6. The system of claim 1 wherein the vehicle and fob GPS units become active in response to actuation of a locating feature on the fob that causes the fob to communicate a wake up signal to the vehicle.

7. The system of claim 1 wherein the vehicle and fob GPS units become active within 10 seconds of each other.

8. The system of claim 1 wherein the fob determines the direction to the vehicle without communicating the fob GPS coordinates to the vehicle.

9. A fob for use in directing a user to a vehicle having a vehicle GPS unit, the fob configured for: after the vehicle GPS unit and a fob GPS are deactivated, activating the vehicle GPS unit in coordination with the fob GPS unit so that GPS coordinates determined by the same are commonly inaccurate; determining a direction to the vehicle as a function of the commonly inaccurate GPS coordinates; and delaying transmission of a coordinate request from the fob GPS unit to a GPS satellite for an amount of time sufficient to allow the vehicle GPS unit to issue a similar coordinate request at the same time: and transmitting a wake up signal to the vehicle GPS unit in response to actuation of a locating button on the fob, the wake up signal used to facilitate activating the vehicle GPS unit, wherein the activating of the vehicle GPS unit and the fob GPS is defined to be at approximately the same time if both of the vehicle and fob GPS transmit requests for GPS coordinates to a GPS satellite at approximately the same time.

10. The fob of claim 9 further configured to determine the direction to the vehicle as a function of vehicle GPS coordinates stored before deactivation of the fob GPS unit if the fob is out of a vehicle communication range.

11. The fob of claim 10 further configured to automatically store the vehicle GPS coordinates prior to deactivation.

12. The fob claim 11 further configured to store the vehicle GPS coordinates upon occurrence of a remote keyless entry (RKE) event.

13. The fob of claim 9 further configured to transmit a wake up signal to the vehicle GPS unit in response to actuation of a locating button on the fob, the wake up signal used to facilitate activating the vehicle GPS unit.

14. The fob of claim 9 further configured for determining the direction to the vehicle without transmitting the fob GPS coordinates to the vehicle.

15. A method of locating a vehicle comprising: determining vehicle GPS coordinates with a vehicle GPS unit included on the vehicle; determining fob GPS coordinates with a fob GPS unit included on the fob; and deactivating both of the vehicle and fob GPS units upon occurrence of a deactivating event and subsequently activating the vehicle and fob GPS units at approximately the same time in order to determine a direction to the vehicle as a function of the vehicle and fob GPS coordinates; and transmitting a wake up signal to the vehicle GPS unit in response to actuation of a locating button on the fob, the wake up signal used to facilitate activating the vehicle GPS unit, wherein the activating of the vehicle GPS unit and the fob GPS is defined to be at approximately the same time if both of the vehicle and fob GPS transmit requests for GPS coordinates to a GPS satellite at approximately the same time.

16. The method of claim 15 further comprising determining the direction to the vehicle as a function of vehicle GPS coordinates stored before deactivating of the fob GPS unit if the fob is out of a vehicle communication range.

17. The method of claim 15 further comprising storing the vehicle GPS coordinates upon occurrence of a remote keyless entry (RKE) event.

18. The method of claim 15 further comprising activating the vehicle and fob GPS units within 10 seconds of each other.

19. The method of claim 15 further comprising determining the direction to the vehicle without transmitting the fob GPS coordinates to the vehicle.

* * * * *